(12) United States Patent
Ge et al.

(10) Patent No.: US 7,700,223 B2
(45) Date of Patent: **\*Apr. 20, 2010**

(54) BATTERY COVER ASSEMBLY FOR PORTABLE ELECTRONIC DEVICE

(75) Inventors: Peng-Jin Ge, Shenzhen (CN); Rui-Hao Chen, Shenzhen (CN); Xing-Huang Luo, Shenzhen (CN); Tai-Jun Liu, Shenzhen (CN); Gang Yang, Shenzhen (CN); Hsiao-Hua Tu, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1122 days.

This patent is subject to a terminal disclaimer.

(21) Appl. No.: 11/265,416

(22) Filed: Nov. 2, 2005

(65) Prior Publication Data

US 2006/0121338 A1    Jun. 8, 2006

(30) Foreign Application Priority Data

Dec. 2, 2004    (TW)    ................ 93219544 U

(51) Int. Cl.
    *H01M 2/04*    (2006.01)
    *H01M 2/10*    (2006.01)
(52) U.S. Cl. .................. 429/97; 429/9; 429/90; 429/100; 455/347
(58) Field of Classification Search .......... 429/163, 429/96–100
    See application file for complete search history.

(56) References Cited

U.S. PATENT DOCUMENTS

| | | | | |
|---|---|---|---|---|
| 5,567,545 | A | * | 10/1996 | Murakami .............. 429/163 |
| 5,607,792 | A | * | 3/1997 | Garcia et al. .............. 429/97 |
| 6,060,193 | A | | 5/2000 | Remes et al. |
| 7,419,742 | B2 | * | 9/2008 | Liu et al. .............. 429/97 |
| 2005/0002154 | A1 | * | 1/2005 | Nishiwaki .............. 361/679 |
| 2006/0148442 | A1 | * | 7/2006 | Liu et al. .............. 455/347 |

FOREIGN PATENT DOCUMENTS

JP    2004247218 A  *  9/2004

OTHER PUBLICATIONS

Machine translation of JP 2004247218 A, Nishiwaki.*

* cited by examiner

*Primary Examiner*—Robert Hodge
*Assistant Examiner*—Sean P Cullen
(74) *Attorney, Agent, or Firm*—Zhigang Ma

(57) ABSTRACT

A battery cover assembly for coupling to a housing of an electronic device, the battery cover assembly comprising: a cover (10) comprising an inner surface (106) and a button slot (101) defined therein; a movable member (20) comprising a main body (21), a button (211) formed on the main body and extending through the button slot, and a catch assembly extending from the main body; and a fixing plate (30) coupled to the cover, with the movable member being sandwiched between the fixing plate and the cover, the fixing plate defining at least one opening, the catch assembly of the movable member extending through the opening and being adapted for engageably securing the cover assembly to the housing (40). The battery cover assembly has a steady structure. The battery cover assembly is convenient to open and close.

18 Claims, 5 Drawing Sheets

BATTERY COVER ASSEMBLY FOR PORTABLE ELECTRONIC DEVICE

FIELD OF THE INVENTION

The present invention generally relates to battery cover assemblies, and more particularly to a battery cover assembly and a battery cover and housing assembly for use in a portable electronic device.

GENERAL BACKGROUND

As power supplies, batteries are widely used in portable electronic devices such as personal digital assistants (PDAs), cellphones and so on. A battery is generally removably mounted in a receptacle of a housing of an electronic device. The receptacle is generally covered by a battery cover. When the battery is damaged or cannot be recharged any more, the cover is removed from the housing, whereupon the battery can be taken out and replaced with a new one.

A latching mechanism is generally employed in a conventional battery cover, to engage with a housing of the portable electronic device. For example, a battery cover of an Alcatel® OT310 cellphone comprises a latching mechanism. The latching mechanism comprises a pair of hooks arranged at a lower end of the battery cover, and a locking pin arranged at an upper end of the battery cover. Correspondingly, a pair of slots is defined at a lower end of a back side of the housing, and a locking hole is defined at an upper end of the back side. In assembly, the hooks are inserted into the corresponding slots. Then, the battery cover is pressed downwardly such that the locking pins of the battery cover are inserted into the corresponding locking holes of the housing. The battery cover is thus assembled to the housing of the cellphone. The battery cover is simple in structure, and the engagement between the battery cover and the housing of the cellphone is secure. However, during disassembly of the cover from the housing of the cellphone, the battery cover is liable to be damaged because great force has to be exerted on the battery cover to detach the battery cover from the housing of the cellphone. As a result, it is inconvenient for a user to change a battery.

What is needed, therefore, is a new battery cover assembly for a portable electronic device which makes it convenient for a user to detach a battery cover of the battery cover assembly from a housing of the portable electronic device.

SUMMARY

A battery cover assembly for a portable electronic device is provided. In a preferred embodiment, a battery cover assembly for portable electronic device includes a cover comprising an inner surface and a button hole defined therein, an elastic member comprising a main pole, a button extending from the main pole up through the button hole, a latch assembly extending transversely from the main pole, a fixing plate defining an aperture-shaped structure, the latch assembly of the elastic member extending up through the aperture-shaped structure, and a fixing structure mounting the fixing plate in the cover. The elastic member is placed between the fixing plate and the cover and can slide relative thereto.

A main advantage of the battery cover assembly is that all the elements of the battery cover assembly are integrated together, to be a whole. Therefore, the battery cover assembly has a steady structure. The battery cover assembly is convenient to open and close.

A battery cover and housing assembly for a portable electronic device is also provided. In a preferred embodiment, a battery cover and housing assembly for a portable electronic device includes a housing, a cover comprising an inner surface and a button hole defined therein, an elastic member comprising a main pole, a button extending from the main pole up through the button hole, a latch assembly extending transversely from the main pole, a fixing plate defining an aperture-shaped structure, the latch assembly of the elastic member extending up through the aperture-shaped structure, and a fixing structure mounting the fixing plate in the cover. The elastic member is placed between the fixing plate and the cover, and can slide relative thereto. The housing is bounded by a peripheral sidewall and a bottom wall, the bottom wall defining a receiving space in a middle portion thereof for receiving batteries or a battery package therein. The housing also comprises a matching latch assembly structure corresponding to the latch assembly.

A main advantage of the battery cover and housing assembly is that the battery cover assembly is connecting the cover and the housing integrated together, to be a complete unit. Therefore, the battery cover and housing assembly has a steady structure.

Other advantages and novel features will become more apparent from the following detailed description when taken in conjunction with the accompanying drawings, in which:

DETAILED DESCRIPTION OF THE PREFERRED EMBODIMENTS

Figure 1:
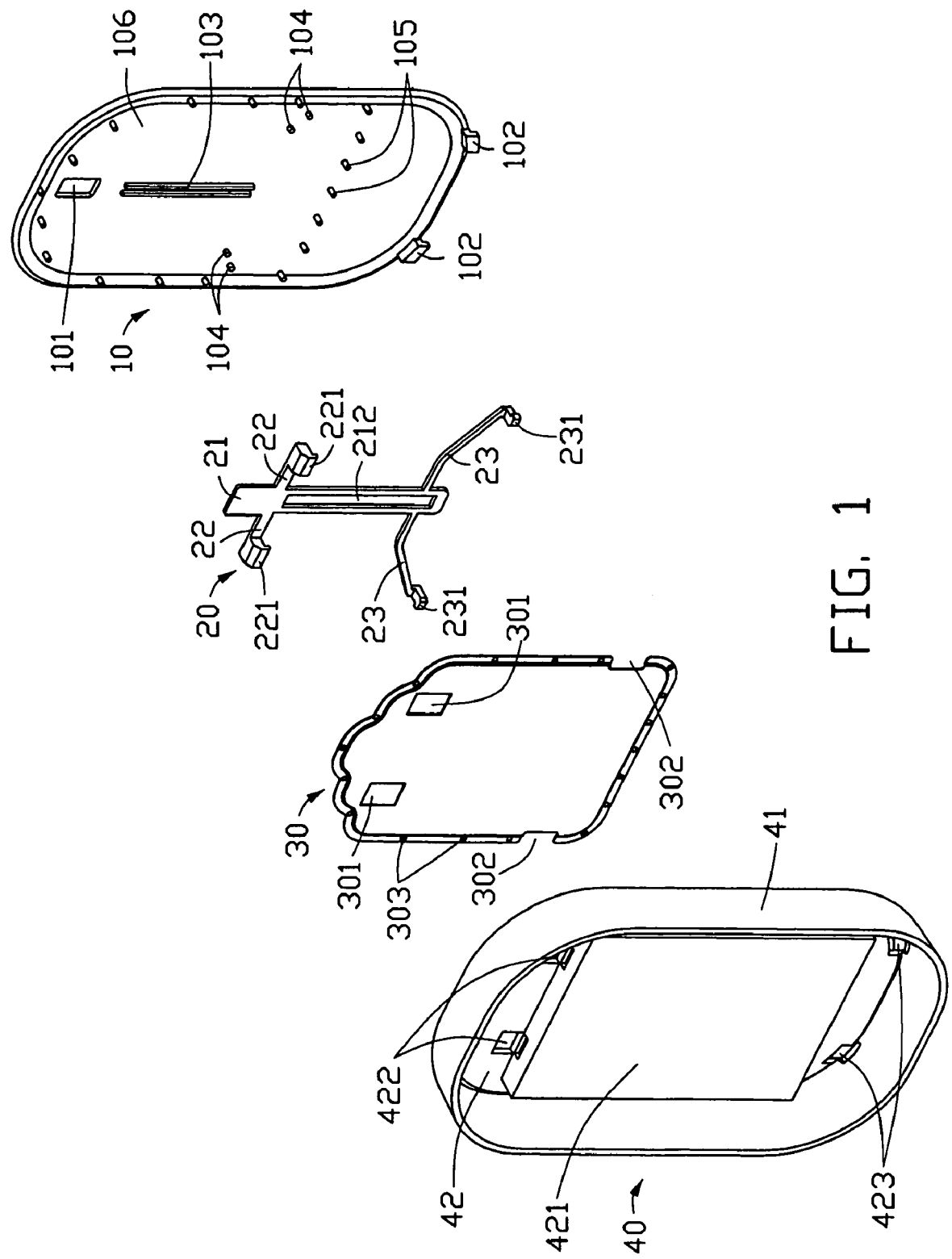
FIG. 1 is an exploded, isometric view of a battery cover assembly and a housing of a portable electronic device, in accordance with a preferred embodiment of the present invention, the battery cover assembly comprising a cover, a movable member and a fixing plate.
Figure 2:
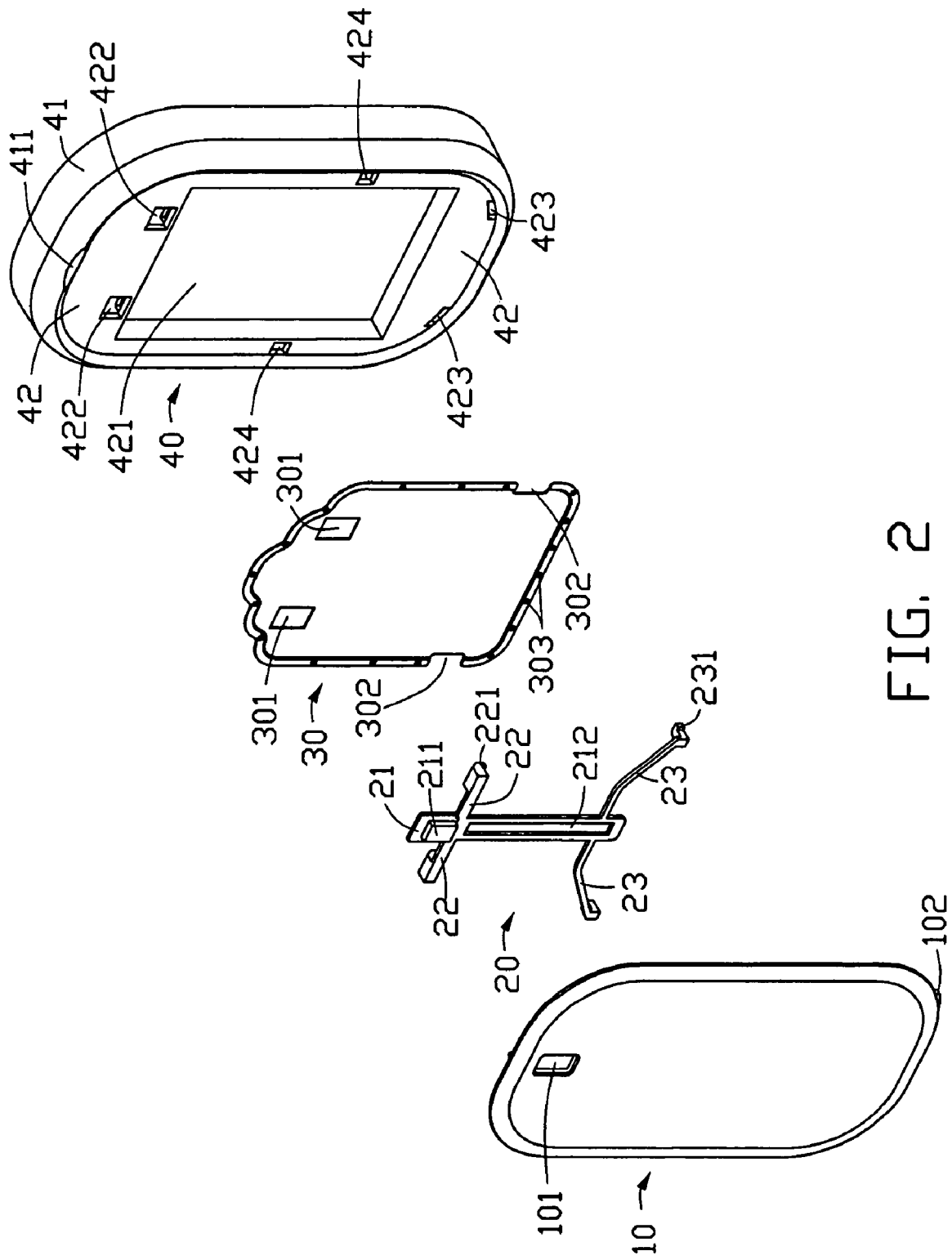
FIG. 2 is similar to FIG. 1, but viewed from another aspect.
Figure 3:
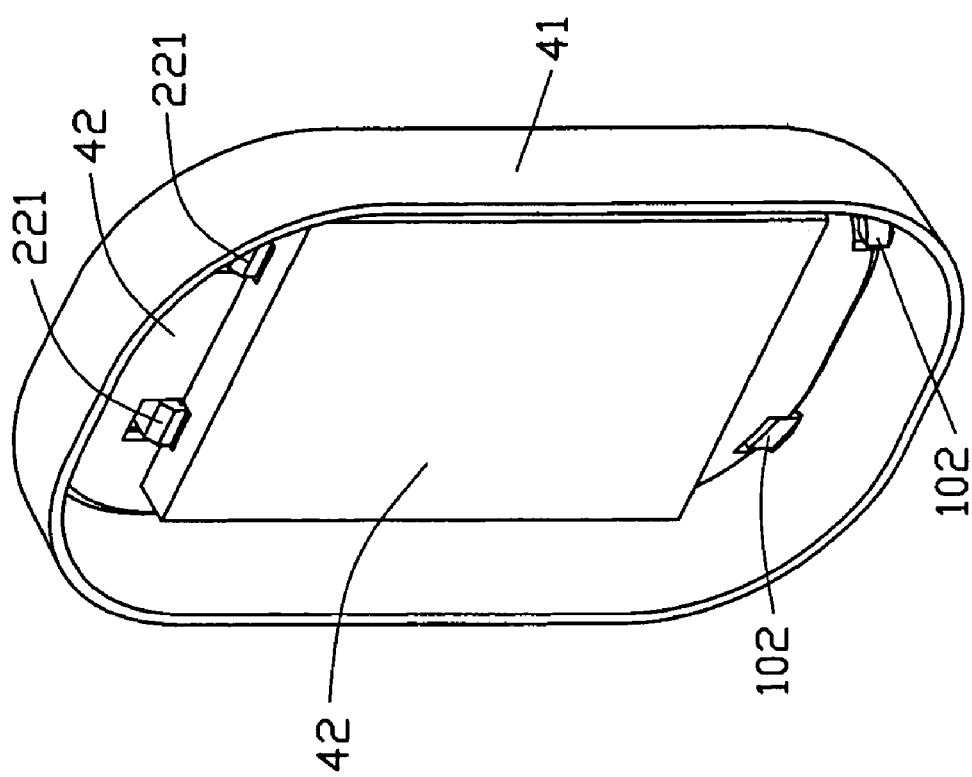
FIG. 3 is a fully assembled view of the battery cover assembly and housing of FIG. 1.
Figure 4:
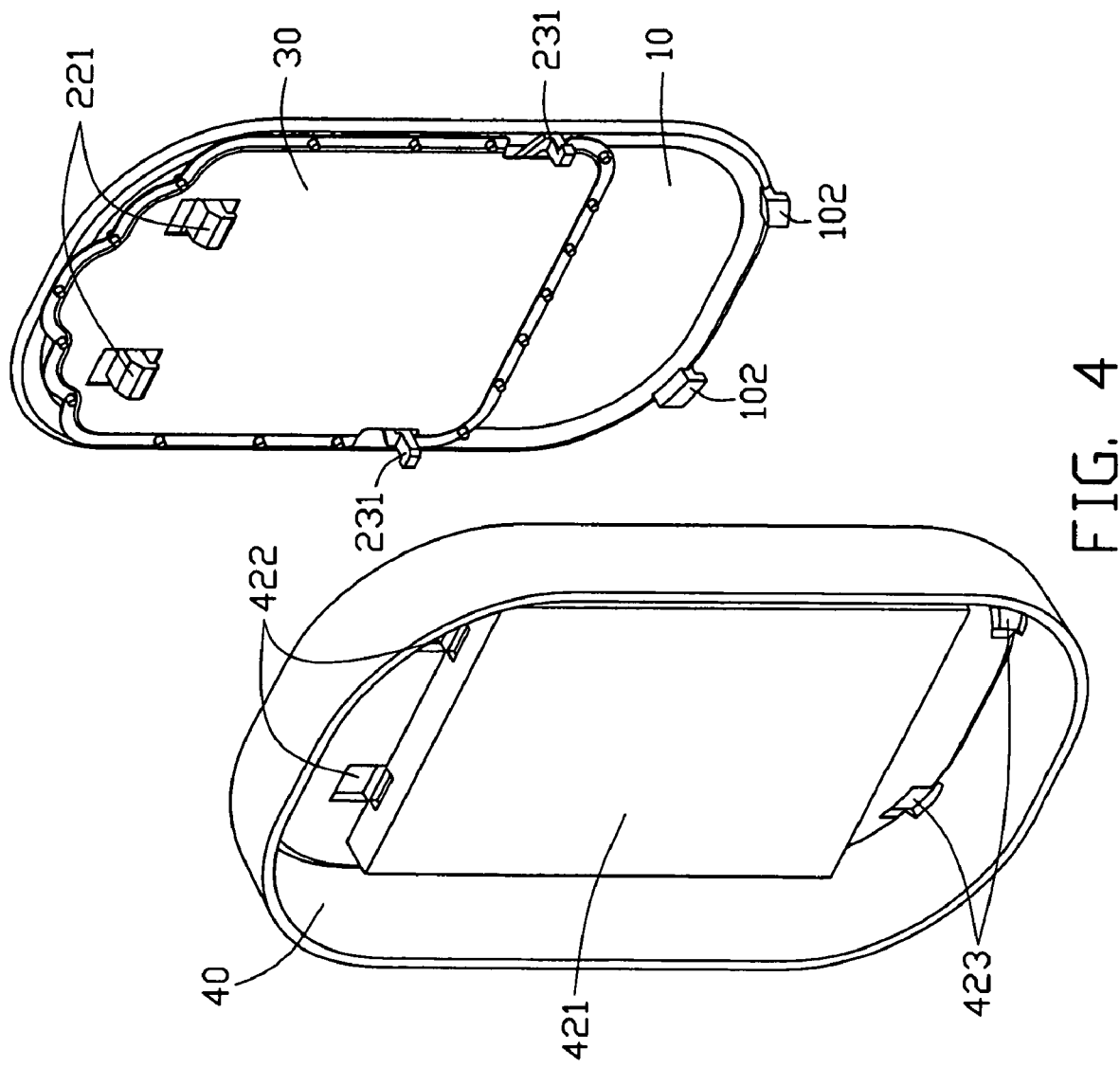
FIG. 4 is an assembled view of the battery cover assembly of FIG. 1, which is shown exploded away from the housing of FIG. 1.
Figure 5:
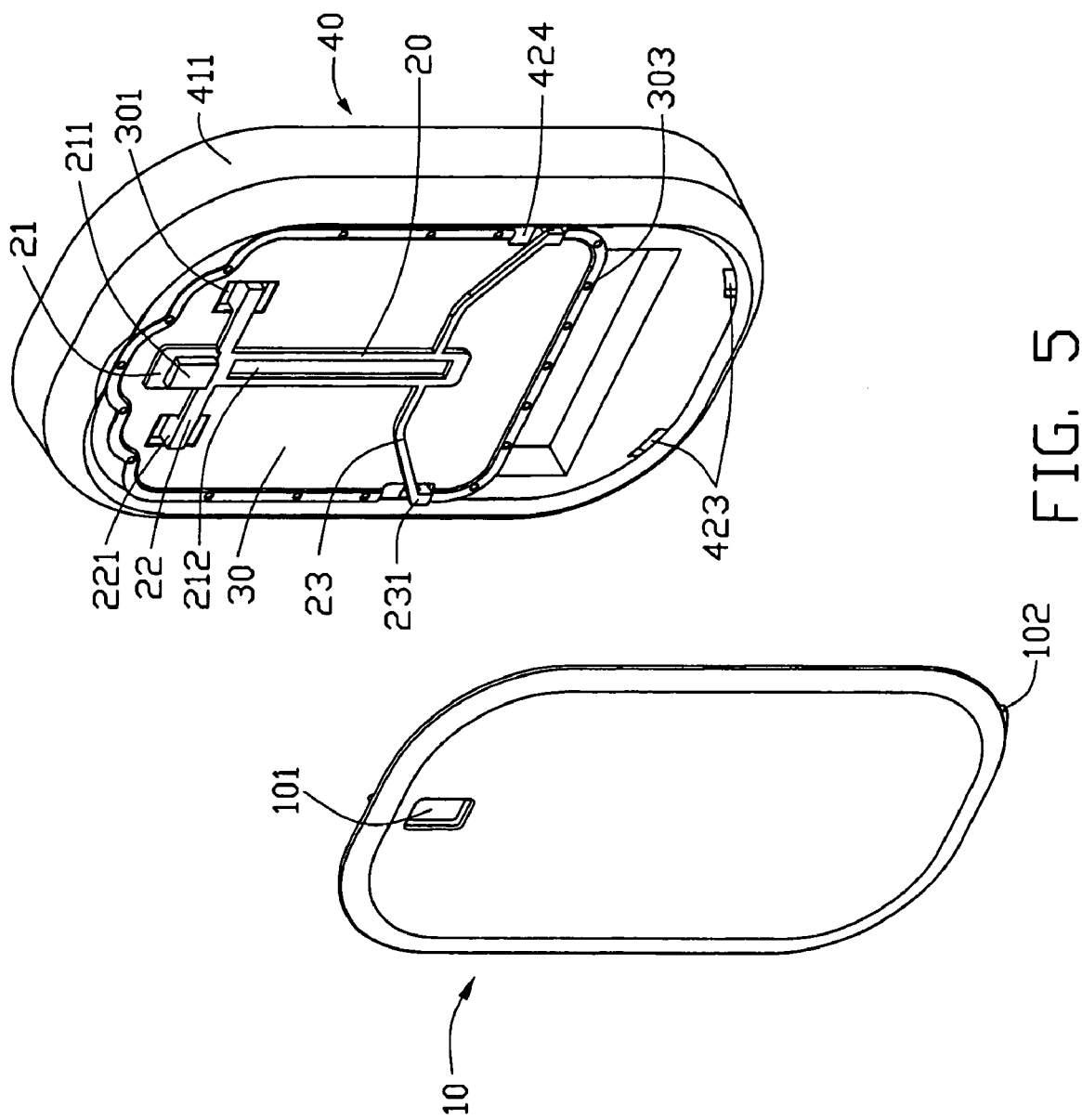
FIG. 5 is a partially assembled view of the battery cover assembly and housing of FIG. 1, but viewed from another aspect.

Referring to FIG. 1 and FIG. 2, in order to simplify the description of the preferred embodiment of the present invention, a battery cover assembly for use in an electronic device like a mobile phone (not shown) is described as follows. The battery cover assembly comprises a cover 10, a movable member 20, and a fixing plate 30. The movable member 20 is sandwiched between the cover 10 and the fixing plate 30. The cover 10 is attached to a housing 40 by means of the movable member 20, which will be explained in detail below.

The cover 10 includes a button slot 101, a pair of latches 102, a pair of parallel guiding protrusions 103, two pairs of protuberances 104, and a plurality of protrusions 105. The button slot 101 is defined in a first end of the cover 10. The latches 102 extend downwardly from a second opposite end of the cover 10. The guiding protrusions 103 are formed on a middle portion of an inner surface 106 of the cover 10. The pairs of protuberances 104 are symmetrically formed on opposite lateral edge portions of the inner surface 106, and correspond to a pair of resilient catch legs (which will be explained in detail below). The protrusions 105 are arranged on the cover 10, corresponding a contour of the fixing plate 30.

The movable member 20 comprises a main body 21 and two sets of engagement means. The main body 21 includes a button 211 formed on an upper portion thereof. A length of the button 211 is shorter than that of the button slot 101 of the cover 10. The button extends through the button slot 101 with a portion thereof being exposed beyond the cover 10. The movable member 20 further includes a pair of catch arms 22 extending away from the main body 21 as one set of the two sets of engagement means, a pair of resilient catch legs 23 extending away from the main body 21 as the other set of the two sets of engagement means, and a guiding slit 212. The catch arms 22 extend transversely from opposite lateral sides of the main body 21, and are located adjacent the first end of the main body 21. The resilient arms 23 extend transversely from opposite lateral sides of the main body 21, and are located adjacent an opposite second end of the main body 21. The guiding slit 212 is defined in the movable member 20 between the catch arms 22 and the resilient catch legs 23. A catch 221 is formed at a distal end of each catch arm 22, and extends opposite from the button 211. The catches 221 are wedge-shaped. A hook 231 is formed at a distal end of each catch leg 23, and extends opposite from the button 211. The guiding slit 212 is configured to correspond to the guiding protrusions 103, with a length of the guiding slit 212 being greater than that of the guiding protrusions 103.

The fixing plate 30 is generally made of metallic material. Two catch holes 301 are symmetrically defined in vicinity of a first end of the fixing plate 30, for extension of the catches 221 of the movable member 20 therethrough. Two opposite rectangular cutouts 302 are symmetrically defined in vicinity of a second opposite end of the fixing plate 30, respectively, for extension of the hooks 231 of the movable member 20 therethrough. A plurality of apertures 303 are defined in the fixing plate 30, for receiving the protrusions 105. The movable member 20 is sandwiched between the cover 10 and the fixing plate 30 by the engagement of the protrusions 105 of the cover 10 in the apertures 303 of the fixing plate 30.

The housing 40 comprises a peripheral sidewall 41 and a bottom wall 42. A recess 411 is defined in an outer surface of a first end of the sidewall 42, for facilitating gripping and holding of the button 211 by a user. The bottom wall 42 defines a receptacle 421 in a middle portion thereof which has a space for receiving components like batteries or a battery package therein. A pair of catch slots 422 are defined in the bottom wall 42. The catch slots 422 are located adjacent the recess 411, for engageably receiving the catches 221 of the movable member 20. Two hook slots 424 are defined in the sidewall 41, for engageably receiving the hooks 231 of the movable member 20. Two mounting grooves 423 are defined in the bottom wall 42, for engageably receiving the latches 102 of the cover 10.

Referring to FIGS. 1-5, in assembly of the battery cover assembly, the movable member 20 and the fixing plate 30 are sequentially assembled to the cover 10. Firstly, the movable member 20 is attached onto the inner surface 106 of the cover 10, with the button 211 being aligned with the button slot 101 and the guiding protrusions 103 being aligned with the guiding slit 212. Then the movable member 20 is pressed so that the button 211 is inserted through the button slot 101, and the guiding protrusions 103 are slidably received in the guiding slit 212. The movable member 20 is thus lengthways movable relative to the cover 10. The movable member 20 is prevented from being displaced breadthways by the configuration of the guiding protrusions 103. To attach the fixing plate 30 to the cover 10, the catches 221 and the hooks 231 are aligned with the catch holes 301 and the cutouts 302 respectively. The movable member 20 is then pressed toward the cover 10 so as to cause the protrusions 105 to engage in the apertures 303. Meanwhile, the catches 221 and the hooks 231 extend through the catch holes 301 and the cutout 302, respectively. The movable member 20 is thus secured to the cover 10.

In order to attach the assembled battery cover assembly 10 to the housing 40, the latches 102 of the cover 10 are inserted into the mounting grooves 423 of the housing 40. The catches 221 of the movable member 20 extend into the catch slots 422. The hooks 231 of the movable member 20 extend into the slots 424. The cover assembly 10 is then pressed downwardly, so that the catches 221 are engaged in the catch slots 422, and the hooks 231 are engaged in the catch slots 424. The cover 10 is thus securely attached to the housing 40.

When detaching the cover assembly 10 from the housing 40, the button 211 is depressed and then moved upwardly, whereupon the catches 221 of the movable member 20 are disengaged from the catch slots 422. Simultaneously, the resilient arms 23 are deformed inwardly by the protuberances 104, whereby the hooks 231 disengage from the hook slots 424. The latches 102 of the cover 10 are then dismounted from the catch slots 422 of the housing 40. The cover 10 is then easily released from the housing 40.

In other exemplary embodiments, a plurality of protrusions 105 may be arranged on the fixing plate 30, and a plurality of apertures 303 may be correspondingly defined in the cover 10. Likewise, a pair of parallel guiding protrusions 103 may be arranged on the movable member 20, with a corresponding guiding slit 212 being defined in a middle portion of the cover 10.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery cover assembly for coupling to a housing of an electronic device, the battery cover assembly comprising:
    a cover comprising an inner surface and a button slot defined therein;
    a movable member comprising a main body, a button formed on the main body and extending through the button slot, and a catch assembly extending from the main body; and
    a fixing plate coupled to the cover, with the movable member being sandwiched between the fixing plate and the cover, the catch assembly of the movable member extending through the fixing plate and engageably securing to the housing; wherein
    the movable member is movable relative to the cover, with the button being lengthways movable relative to the cover between a first position where the button is located in the vicinity of a first end of the button slot, and the catch assembly can be disengaged from the housing, and a second position where the button is located in the vicinity of an opposite second end of the button slot, and the catch assembly can be engaged with the housing.

2. The battery cover assembly as claimed in claim 1, wherein the cover further comprises a pair of latches extending from a lower end of the inner surface, for engagement with the housing.

3. The battery cover assembly as claimed in claim 1, wherein the cover further comprises two protuberances extending from the inner surfaces.

4. The battery cover assembly as claimed in claim 1, wherein the button slot is located in an upper part of the cover, and a length of the button slot is greater than that of the button.

5. The battery cover assembly as claimed in claim 1, wherein the cover further comprises two parallel guiding protrusions formed on the inner surface, the main body of the movable member defines a guiding slit with a length greater than that of the guiding protrusions, and the movable member is movable relative to the cover with the guiding protrusions slidable in the guiding slit.

6. The battery cover assembly as claimed in claim 1, wherein the catch assembly comprises a pair of catch arms and a pair of resilient catch legs respectively transversely extending from opposite lateral sides of the main body of the movable member, each of the catch arms has a catch formed at a distal end thereof, and each of the resilient catch legs has a hook formed at a distal end thereof, the protuberances abutting against the corresponding resilient catch legs.

7. The battery cover assembly as claimed in claim 6, wherein the two catch holes are defined in the fixing plate, with the corresponding catches extending therethrough, and two cutouts are respectively defined in two sides of the fixing plate, with the hooks extending therethrough.

8. The battery cover assembly as claimed in claim 1, wherein the cover further comprises a plurality of protrusions extending therefrom and arranged corresponding a contour of the fixing plate, the fixing plate defines a plurality of apertures at a peripheral edge configured to correspond to the protrusions of the cover, and the protrusions are securely engaged in the corresponding apertures.

9. A battery cover and housing assembly for a portable electronic device, comprising:
  a cover assembly comprising:
    a cover comprising an inner surface and a button slot defined therein;
    a movable member comprising a main body, a button formed on the main body and extending through the button slot, and a first catch assembly extending from the main body; and
    a fixing plate coupled to the cover, with the movable member being sandwiched between the fixing plate and the cover, the first catch assembly of the movable member extending through the fixing plate; and
  a housing comprising a peripheral sidewall and a bottom wall, the bottom wall defining a receptacle for receiving batteries or a battery package therein, the housing comprising a mating catch assembly detachably engaged with the first catch assembly of the movable member;
  wherein the movable member is movable relative to the cover, with the button being lengthways movable relative to the cover between a first position where the button is located in the vicinity of a first end of the button slot, and the first catch assembly can be disengaged from the mating catch assembly of the housing, and a second position where the button is located in vicinity of a lower end of the button slot, and the first catch assembly can be engaged with the mating catch assembly of the housing.

10. The battery cover and housing assembly as claimed in claim 9, wherein the cover further comprises a pair of latches extending from a bottom end thereof.

11. The battery cover and housing assembly as claimed in claim 9, wherein the cover further comprises two protuberances extending from the inner surface.

12. The battery cover and housing assembly as claimed in claim 9, wherein the button slot is located in an upper part of the cover, and a length of the button slot is greater than that of the button.

13. The battery cover and housing assembly in claim 9, wherein the cover further comprises a guiding protrusion formed on the inner surface, the main body defines a guiding slit with a length greater than that of the guiding protrusion, and the movable member is movable relative to the cover, with the guiding protrusion slidable in the guiding slit.

14. The battery cover and housing assembly for as claimed in claim 9, wherein the first catch assembly comprises a pair of catch arms and a pair of resilient catch legs extending from the main body of the movable member, each of the catch arms has a catch formed at a distal end thereof, and each of the resilient catch legs has a hook formed at a distal end thereof, the protuberances abutting against the corresponding resilient catch legs.

15. The battery cover and housing assembly as claimed in claim 14, wherein two catch holes are defined in the fixing plate, with the corresponding catches extending therethrough, and two cutouts defined in the fixing plate, with the hooks extending therethrough.

16. The battery cover and housing assembly as claimed in claim 9, wherein the cover further comprises a plurality of protrusions extending therefrom, the fixing plate defines a plurality of apertures configured to correspond to the protrusions of the cover, and the protrusions are securely engaged in the corresponding apertures.

17. The battery cover and housing assembly as claimed in claim 14, wherein the mating catch assembly comprises two catch slots defined in the bottom wall, with the catches of the catch arms engaging therein, and two hook slots defined in the sidewall thereof, with the hooks of the resilient catch legs engaging therein.

18. The battery cover and housing assembly as claimed in claim 11, wherein the housing defines a pair of grooves, with the latches of the cover engaging therein.

\* \* \* \* \*